(12) United States Patent
Hull et al.

(10) Patent No.: US 7,889,035 B2
(45) Date of Patent: Feb. 15, 2011

(54) METHODS FOR CHARGING AND USING PULSED-POWER SOURCES

(75) Inventors: John R. Hull, Sammamish, WA (US); Michael Strasik, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 530 days.

(21) Appl. No.: 11/951,664

(22) Filed: Dec. 6, 2007

(65) Prior Publication Data

US 2010/0045130 A1   Feb. 25, 2010

(51) Int. Cl.
*H01F 6/00* (2006.01)
(52) U.S. Cl. .......................... 335/216; 29/599; 29/598; 363/128
(58) Field of Classification Search ................ 29/592.1, 29/596–598, 732–736, 6.1; 310/184, 208; 219/130.51; 372/34, 38, 55–57, 87; 335/16, 335/216, 284; 96/25, 54, 82, 86; 363/128, 363/84–85
See application file for complete search history.

(56) References Cited

U.S. PATENT DOCUMENTS

| | | | | |
|---|---|---|---|---|
| 5,936,988 A * | 8/1999 | Partlo et al. | ............... | 372/38.04 |
| 6,455,808 B1 * | 9/2002 | Chung et al. | ........... | 219/130.51 |
| 6,618,421 B2 * | 9/2003 | Das et al. | ....................... | 372/55 |
| 2010/0045130 A1 * | 2/2010 | Hull et al. | ................... | 310/113 |

OTHER PUBLICATIONS

"Hull et al. Applications of Bulk High-Temperature Superconductors," *Proceedings of the IEEE*, vol. 92, No. 10, pp. 1705-1718, Oct. 2004.
Tomita, et al., "High-Temperature Superconductor Bulk Magnets That Can Trap Magnetic Fields of Over 17 Telsa at 29 K," *Nature*, vol. 421, 2003, pp. 517-520, Oct. 2003.

* cited by examiner

*Primary Examiner*—Minh Trinh
(74) *Attorney, Agent, or Firm*—Hope Baldauff Hartman, LLC

(57) ABSTRACT

Methods and systems provide pulsed-power to a load utilizing high temperature superconductors (HTS) within multiple pulsed-power devices. According to embodiments described herein, each pulsed-power device includes a HTS mounted on a rotor and an armature coil mounted on a stator. The rotor is positioned to allow a magnetic field within the HTS to induce a voltage in the armature coil when the rotor is rotating and to allow a magnetic field created by passing current through the armature coil to charge the HTS. Current created from the operation of a first pulsed-power device is routed to the armature coil in a second pulsed-power device to charge the associated HTS to a higher value. Subsequently, the second pulsed-power device is operated to produce current that is used to further charge the HTS in the first pulsed-power device. This bootstrapping procedure is repeated until all HTSs are fully charged.

13 Claims, 12 Drawing Sheets

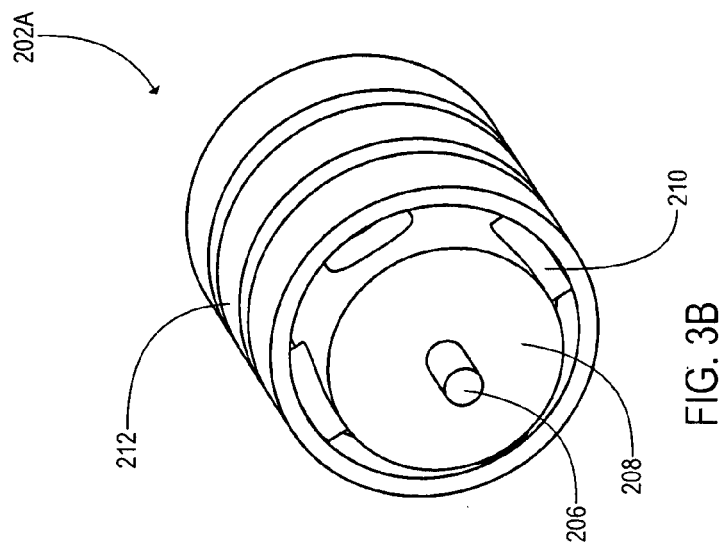
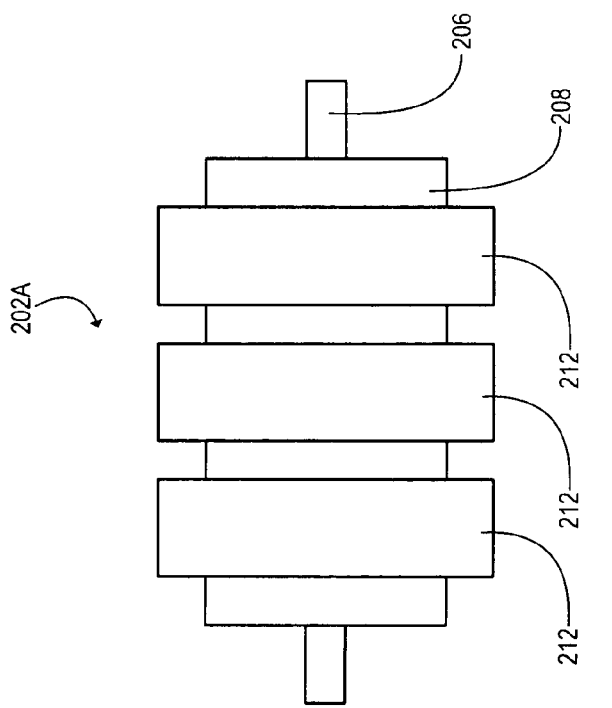

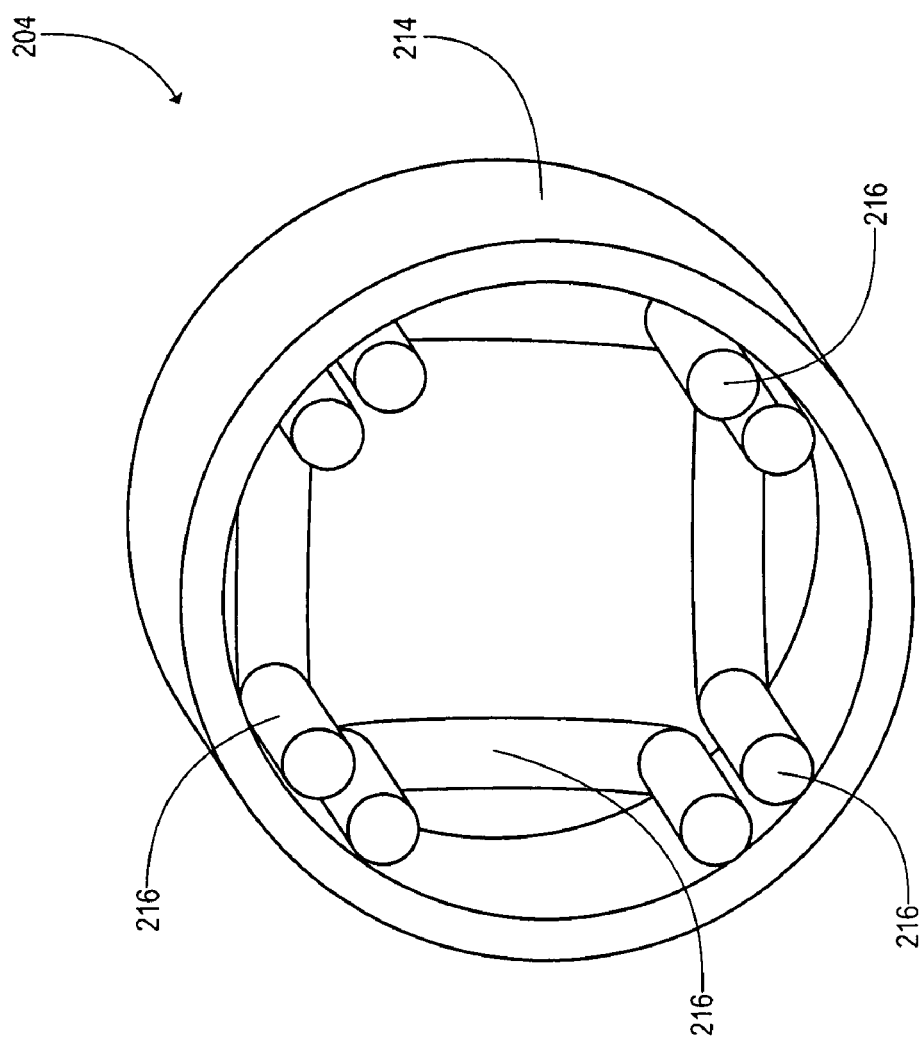

METHODS FOR CHARGING AND USING PULSED-POWER SOURCES

TECHNICAL FIELD

The present disclosure relates generally to pulsed-power systems, and more particularly to the use of high-temperature superconductors within pulsed-power systems.

BACKGROUND

Pulsed-power systems are used to provide stored energy over short intervals in an effort to deliver peak power to a specified load. Pulsed-power systems may be implemented using compensated pulsed alternators ("compulsators"). Compulsators are commonly radial-flux alternators having rotating field windings that are energized by brushed contacts. The rotating magnetic field from the field windings induces a pulsed voltage in stationary armature windings, which in turn deliver a pulsed current to the load. The power of these types of rotating pulsed-power supplies is proportional to the magnetic field that the field windings exert on the armature windings. Heating and other mechanical constraints typically limit the magnetic field supplied by the rotating field windings to about 3 Tesla on the armature windings. This magnetic field limitation prevents conventional compulsators from being used to produce motors and generators having high specific power.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Methods and systems described herein provide for the use of high-temperature superconductors (HTS) within a pulsed-power source to significantly increase the specific power of the pulsed-power source as compared to conventional pulsed-power systems. The improved specific power allows for devices using pulsed-power systems to appreciate increased power densities, ultimately resulting in decreasing the size of the pulsed-power systems and the devices that use them. To allow for the use of HTSs within the pulsed-power systems without requiring large external equipment for creating the magnetic fields to be trapped within the HTSs, the embodiments described herein additionally provide for bootstrap charging the HTSs using multiple pulsed-power devices.

According to embodiments described herein, a method for charging a pulsed-power system includes providing an initial magnetic field, or charge, to a trapped-flux, high-temperature superconductor (HTS) that is mounted on a rotor within a pulsed-power device. The rotor is spun up to operational speed, which induces a voltage in an associated armature coil to create a pulsed current. The pulsed current is routed to an armature coil of a second pulsed-power device to induce a magnetic field around the armature coil. A HTS mounted on the rotor of the second pulsed-power device is subjected to the magnetic field, and in turn, receives a partial charge. The second pulsed-power device is then spun up to induce a voltage in the corresponding armature coil that creates a pulsed current. This pulsed current is stronger than that produced by the first pulsed-power device due to the stronger magnetic field trapped within the second HTS as compared to that in the first HTS. The pulsed current is routed from the second pulsed-power device to the armature coil in the first pulsed-power device and the first HTS is introduced to the associated magnetic field to increase the charge within the first HTS.

According to further embodiments, a system for providing pulsed current to a load includes a number of linked pulsed-power devices and controlling circuitry. Each pulsed-power device includes a rotor with a mounted HTS and a stator with a mounted armature coil. The power-control circuitry allows each HTS to be charged by routing current from the armature coil of each pulsed-power device to the armature coil of at least one other pulsed-power device to create a magnetic field that is trapped by a corresponding HTS. The power-control circuitry additionally provides pulsed current created while exposing the armature coil of each pulsed-power device to a rotating magnetic field from each HTS during operation of the pulsed-power devices to the load.

Other embodiments provide a method for providing pulsed current to a load. A rotor of a first pulsed-power device is positioned to align a HTS mounted on the rotor with an armature coil mounted on a stator. Current is received in the armature coil to induce a magnetic field that is trapped within the HTS. A rotor of a second pulsed-power device is similarly positioned to align a HTS on the rotor with an armature coil on a stator. The rotor of the first pulsed-power device is rotated to induce a voltage within the corresponding stator from the magnetic field trapped within the HTS. The resulting pulsed current is routed to the armature coil of the second pulsed-power device to induce a magnetic field that charges or further charges the HTS of that device. The rotors with the HTSs of both devices are rotated to induce a voltage in the corresponding armature coils that is used to create a strong pulsed current that is delivered to the load.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

FIGS. 3A and 3B are side and perspective views, respectively, of an internal rotor assembly for use within the pulsed-power device of FIG. 2 according to various embodiments presented herein;

FIGS. 4 and 5 are perspective views of stator assemblies for use within the pulsed-power device of FIG. 2 according to various embodiments presented herein;

DETAILED DESCRIPTION

The following detailed description is directed to methods and systems for utilizing high temperature superconductors to provide pulsed-power to a load. As discussed briefly above, magnetic fields exerted on armature windings by the field windings of a typical compulsator are not typically strong enough to produce motors with the high specific power required for many applications. A solution according to the embodiments provided herein includes the use of HTSs in the place of traditional brushed field windings within a compulsator. The magnetic fields trapped in a superconducting single grain monolith, for example, could be several times higher than what is possible with permanent magnets or electromagnets. Because the specific power of a motor or generator is a linear function of a magnetic field, the use of HTSs within a compulsator as described in the embodiments below can significantly increase the power density within motors and generators that utilize compulsators. As will become clear from the disclosure below, the use of HTSs creates a brushless system that exerts very high magnetic fields on armature windings to produce pulsed-power devices with power densities significantly higher than that of contemporary devices.

However, to utilize HTSs in a compulsator to create a pulsed-power device with high specific power, the magnetic field required to create the trapped flux state within the HTS must be higher than the trapped field. Typically, a discharge from a substantial capacitor into windings surrounding a HTS would be used to initially charge the HTS. In order for the pulsed-power system to be utilized in a vehicle, weapon, or other environment having space, size, and/or weight limitations, the pulsed-power system cannot utilize the relatively large external current sources typically required to fully charge a HTS.

Embodiments of the disclosure provided below replace field windings within two linked compulsators with HTSs to create a pulsed-power system. The various embodiments describe bootstrap charging the HTSs within one compulsator with the output current from the other compulsator. Because applications of pulsed-power systems within aerospace, ground, or sea mobile platforms often utilize counter-rotating pairs of compulsators so that the platform movement is not affected, these types of systems can be modified with HTSs according to the embodiments provided herein to enable pulsed-power systems in mobile platforms with significantly higher specific power than typical mobile systems.

Figure 1:
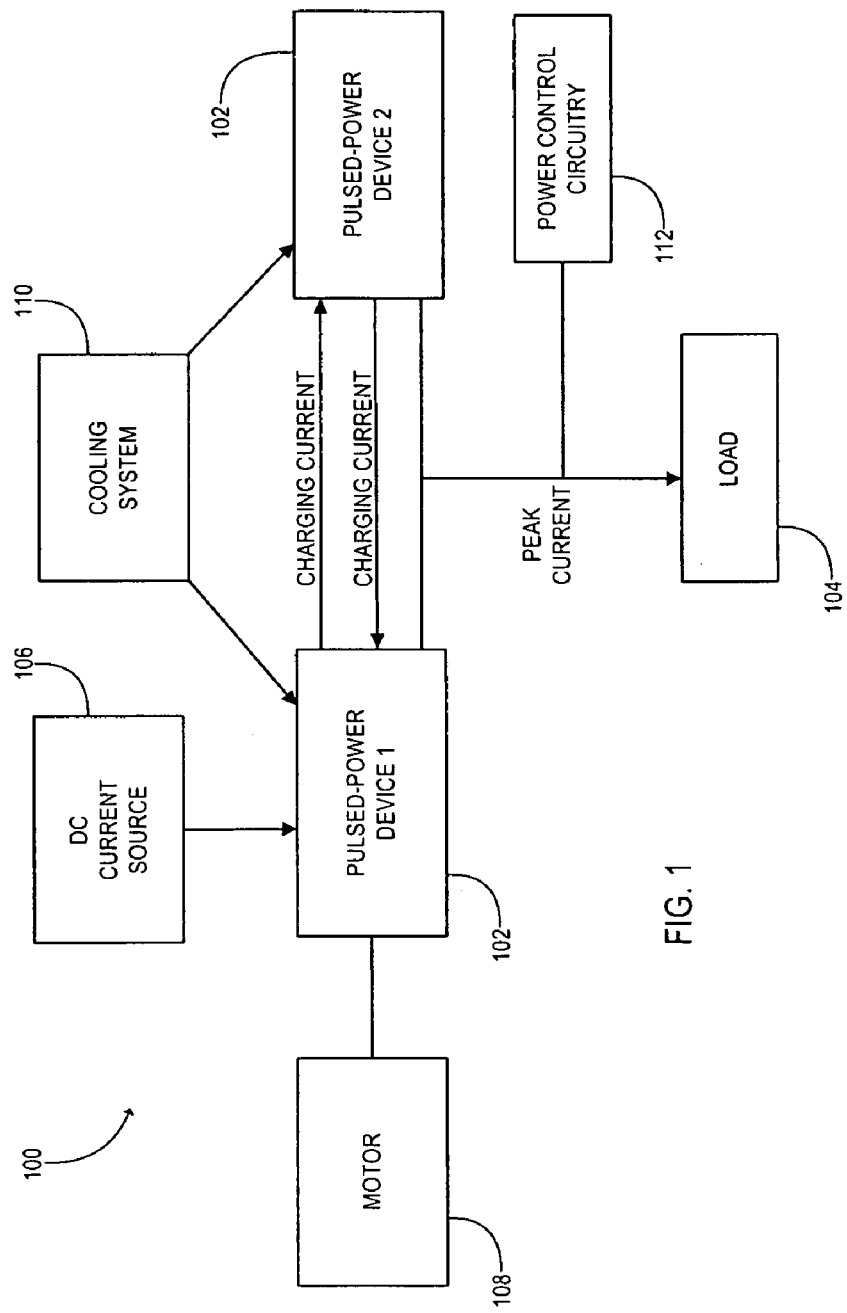
FIG. 1 is a block diagram of a pulsed-power system according to various embodiments presented herein.

In the following detailed description, references are made to the accompanying drawings that form a part hereof, and which are shown by way of illustration, specific embodiments, or examples. Referring now to the drawings, in which like numerals represent like elements through the several figures, aspects of a pulsed-power system will be described. FIG. 1 shows a pulsed-power system 100 according to embodiments described herein. The pulsed-power system 100 includes a first pulsed-power device 102 and a second pulsed-power device 102. It should be appreciated that more than two pulsed-power devices 102 may also be used within the pulsed-power system 100. As will become clear from the description of various embodiments below, each pulsed-power device 102 operates as a compulsator with the field windings replaced by bulk HTSs. The two pulsed-power devices 102 are electrically linked such that the current output from one pulsed-power device 102 may be directed through the armature windings of the other pulsed-power device 102 during the bootstrap charging process described below. After the charging process is complete, the two pulsed-power devices 102 together may be used to provide pulsed current to the load 104. Known power control circuitry 112 is used to provide the current in pulses.

The pulsed-power system 100 additionally includes a direct current (DC) current source 106, motor 108, and cooling system 110. The DC current source 106 may be a small capacitor, battery, flywheel, superconducting inductor, or other current source that is used in the manner described below to provide the initial charge to the first pulsed-power device 102 and/or the second pulsed-power device 102. The DC current source 106 may be connected to the first pulsed-power device 102, the second pulsed-power device 102, or one or more DC current sources 106 may be connected to both the first and second pulsed-power devices 102.

The motor 108, if used within the pulsed-power system 100, may be mechanically attached to the rotor of the first and/or second pulsed-power device 102 to spin the rotor up to the operational rotational speed. It should be appreciated that the power requirements for the motor will be modest since the average period between pulses is much longer than the pulse length. According to an alternative embodiment, the motor 108 is eliminated from the pulsed-power system 100. In this embodiment, current is sent through the armature windings of the pulsed-power devices 102 to spin the corresponding rotor. In doing so, the pulsed-power device 102 works as a brushless synchronous motor while spinning up to speed.

In order to trap magnetic flux, a HTS must be at a temperature below its critical temperature. Depending upon the type of HTS, this critical temperature varies. As an example, a bulk HTS consisting of single-grain Y—Ba—Cu—O (YBCO), and its rare-earth analogs, the critical temperature is of the order of 90 K. According to various embodiments provided herein, there are several methods for cooling the HTSs. The cooling system 110 depicted in FIG. 1 represents the cooling components required by any one of these methods. A first cooling technique is to cool the rotor while it is stationary, using thermal conduction between the rotor and a cold head. The heat capacity of the rotor will keep the rotor sufficiently cold for the lifetime of its mission. This cooling method is useful for very high-speed operation when the rotor must spin in vacuum.

A second cooling method includes cooling the stator and letting heat from the rotor radiate to the stator. One limitation to this method is that radiation heat transfer is low at low temperatures. A third cooling method includes allowing gas to flow in the rotor interior and/or in the gap between the rotor and stator. This gas is then cooled using a cryocooler. It should be appreciated that the cooling system 110 may service all or multiple pulsed-power devices 102 in the pulsed-power system 100 or each pulsed-power device 102 may have a dedicated cooling system 110. In addition to cooling the pulsed-power devices 102, the cooling system 110 may be used to cool the armature windings in order to reduce their resistance and increase the current capacity in them. It should be understood that when charging the HTSs within the pulsed-power devices 102, the precise procedure for cooling while applying a magnetic field may be chosen according to the desired properties of the HTS and the desired trapped magnetic field within. For example, known techniques such as field cooling, adiabatic zero-field cooling, and/or pulsed zero-field cooling may be utilized to charge the HTSs within the pulsed-power devices 102 described herein.

Figure 2:
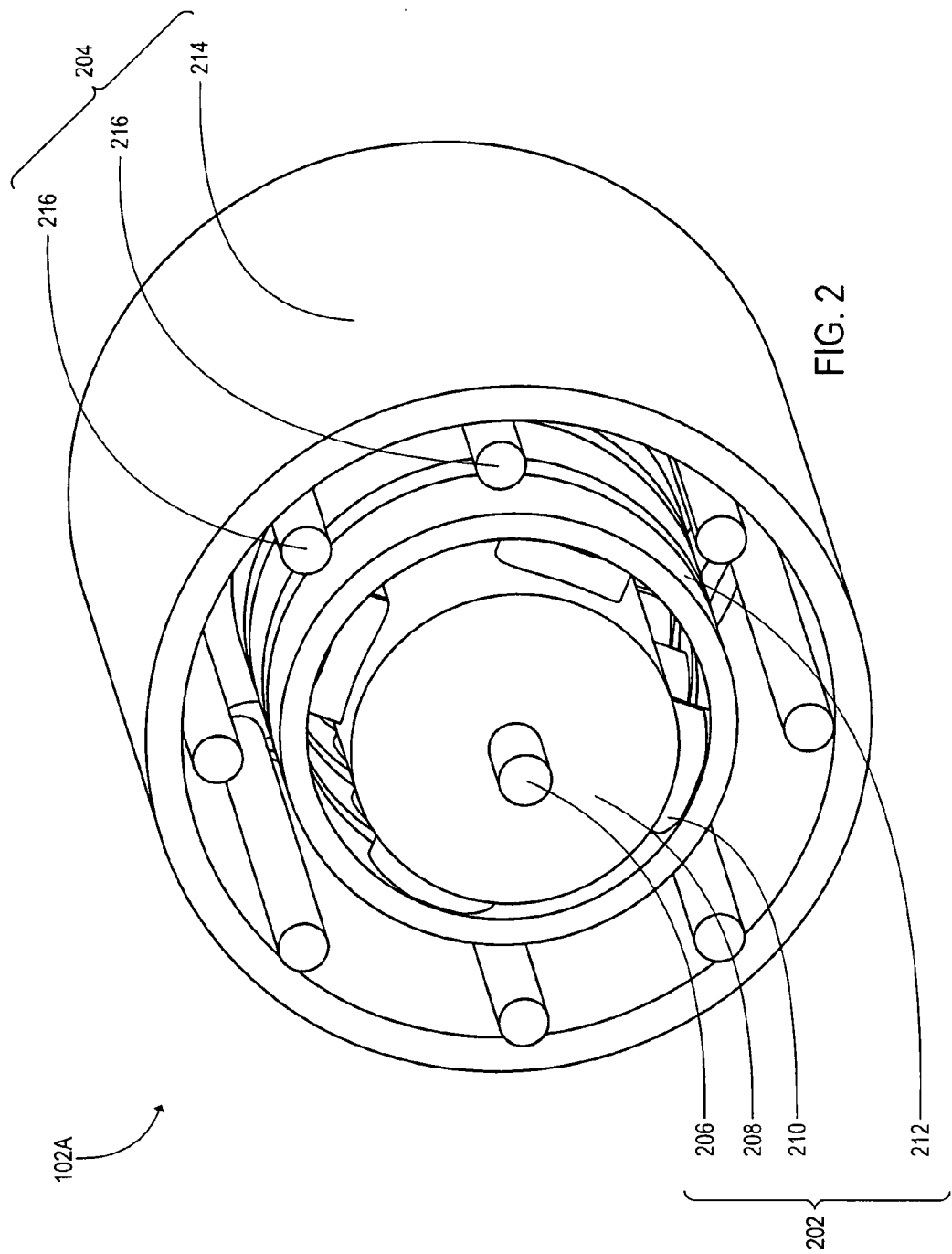
FIG. 2 is a perspective view of a pulsed-power device according to a radial-flux, internal rotor configuration according to various embodiments presented herein.
Figure 5:
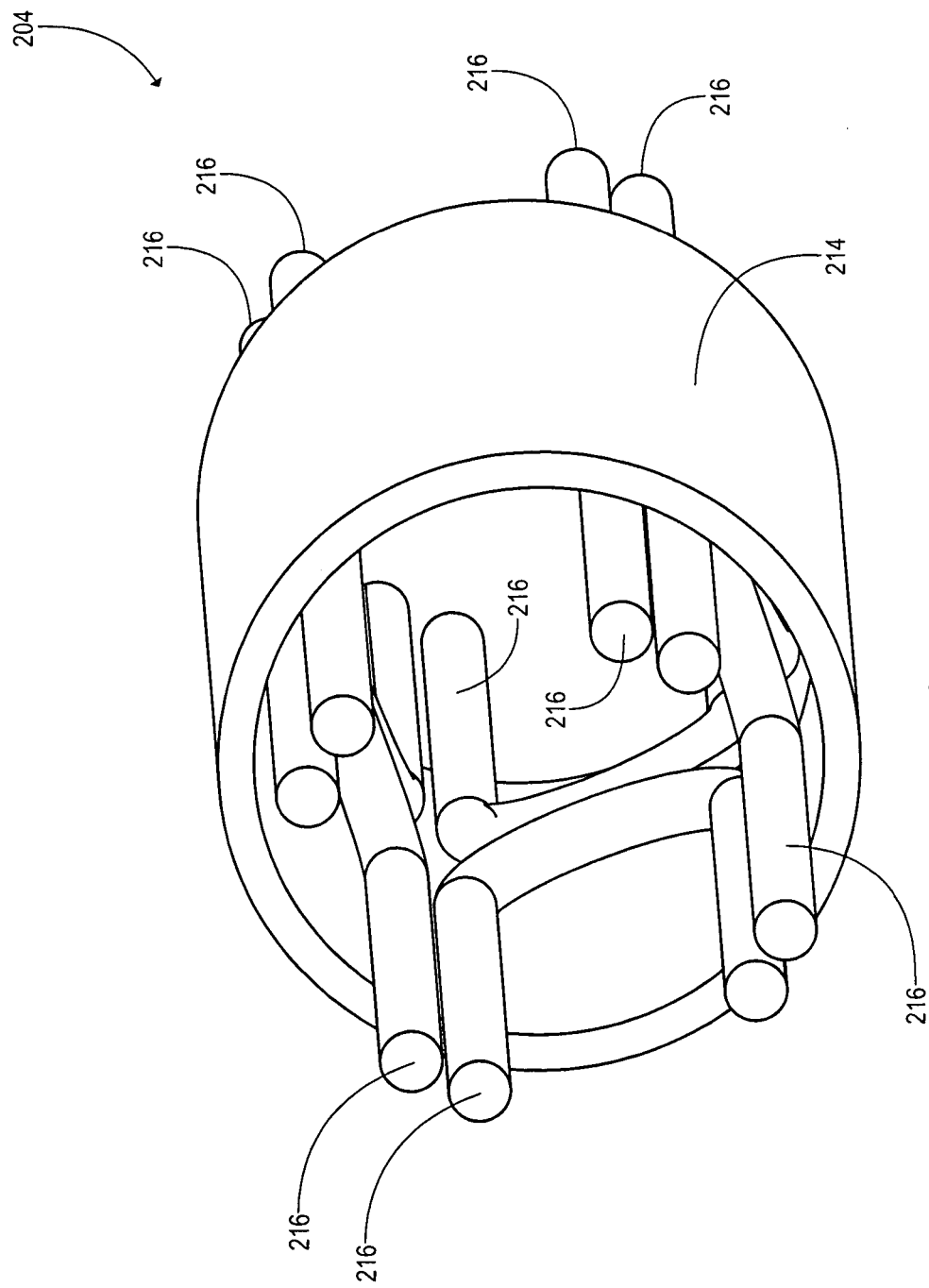

According to various embodiments described herein, there are two major topologies for the pulsed-power devices 102, radial and axial. In addition, there are various possible configurations within each topology. Turning now to FIG. 2, a radial-flux, internal rotor pulsed-power device 102A will be described. The radial-flux, internal rotor pulsed-power device 102A includes an internal rotor assembly 202 that rotates within an external stator assembly 204. The internal rotor assembly 202 is shown separately in FIGS. 3A and 3B, while alternative embodiments of the external stator assembly 204 are shown in FIGS. 4 and 5.

The internal rotor assembly 202 includes a shaft 206 connected to an internal rotor 208. A number of bulk HTSs 210 are secured to the exterior surface of the internal rotor 208. Banding material 212 wraps around the outer surface of the HTSs 210 to provide a mechanical restraint against the centrifugal forces when the internal rotor 208 is rotating at high speeds. The radial-flux, internal rotor pulsed-power device 102A is shown in a configuration that includes four axial rows of HTSs 210 evenly spaced around the circumference of the internal rotor 208, with three HTSs 210 in each row. Bulk HTSs 210 in each row are magnetized radially, with bulk HTSs 210 in the same row magnetized in the same direction. It should be understood that any number of HTSs 210 may be utilized and positioned at any location around the exterior surface of the internal rotor 208 depending on the desired characteristics of the radial-flux, internal rotor pulsed-power device 102A and the type of HTS 210 used.

Because three HTSs 210 are shown in each row around the circumference of the internal rotor 208, three rings of banding material 212 are shown, one for the first, second, and third HTSs 210 in each row, respectively, as best seen in FIGS. 3A and 3B. The banding material may be a metal, a fiber composite material, or any other suitable material. The HTSs 210 may consist of any type of superconductor materials and may be any size without departing from the scope of this disclosure. The choice of HTS 210 will be made according to the application for which the pulsed-power device 102 will be used. According to one embodiment, the HTSs 210 are approximately 2.6 cm diameter YBCO disks internally impregnated with Bi—Pb—Sn—Cd alloy. A trapped magnetic field generally between 9 T and 17 T may be possible between generally 46 K and 29 K for HTSs 210 of this type.

Looking now at FIGS. 2, 4, and 5, aspects of the external stator assembly 204 will be described according to various embodiments presented herein. The external stator assembly 204 includes an external stator 214 and armature windings, or armature coils 216. The armature coils 216 consist of axially oriented cables made of a large number of parallel strands of fine-filament Litz wire to minimize eddy currents. Alternatively, the armature coils 216 may consist of superconducting wires. It should be understood that any type of material commonly used for armature coils 216 may be used without departing from the scope of this disclosure.

Each armature coil 216 corresponds to a row of HTSs 210 and may include an end turn at one end of the external stator 214 as shown in FIGS. 2 and 4. Alternatively, the external stator 214 may include two armature coils 216 corresponding with each row of HTSs 210, each armature coil 216 entering and leaving at one end of the pulsed-power device 102, with the end turns of both armature coils 216 located in the middle of the external stator 214, as shown in FIG. 5. With this embodiment, more than one pulsed-power device 102 may be utilized to simultaneously bootstrap charge a row of HTSs 210 on the pulsed-power device 102. Additionally, this embodiment simultaneously induces voltage in two sets of armature coils 216 for each row of HTSs 210, a feature that can be useful depending on the application of the radial-flux, internal rotor pulsed-power device 102A.

In either embodiment, the external stator 214 provides a mechanical constraint for the armature coils 216 against the forces applied to them from the HTSs 210. As seen in FIG. 2, the radial-flux, internal rotor pulsed-power device 102A configuration provides a gap between the HTSs 210 and the armature coils 216 that is interrupted by the banding material 212. The properties of the banding material 212 and the corresponding HTSs 210 and armature coils 216 must be taken into account when establishing the gap distance. Moreover, because the internal rotor 208 may tend to expand at high rotational velocities, the external stator assembly 204, and/or the armature coils 216 may be designed to move slightly radially outward as the rotational velocity increases in an effort to maintain a constant gap width, if desired.

Figure 6:
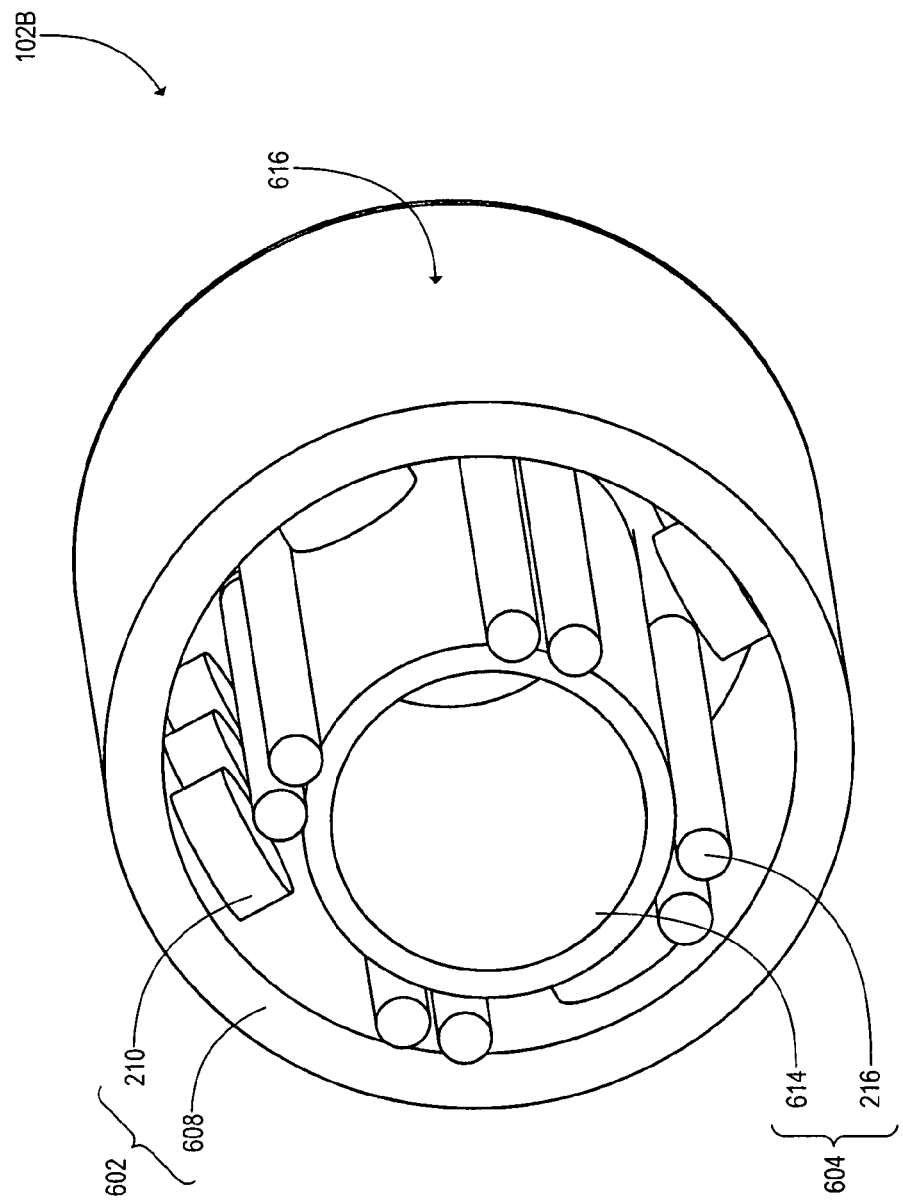
FIG. 6 is a perspective view of a pulsed-power device according to a radial-flux, external rotor configuration according to various embodiments presented herein.
Figure 7:
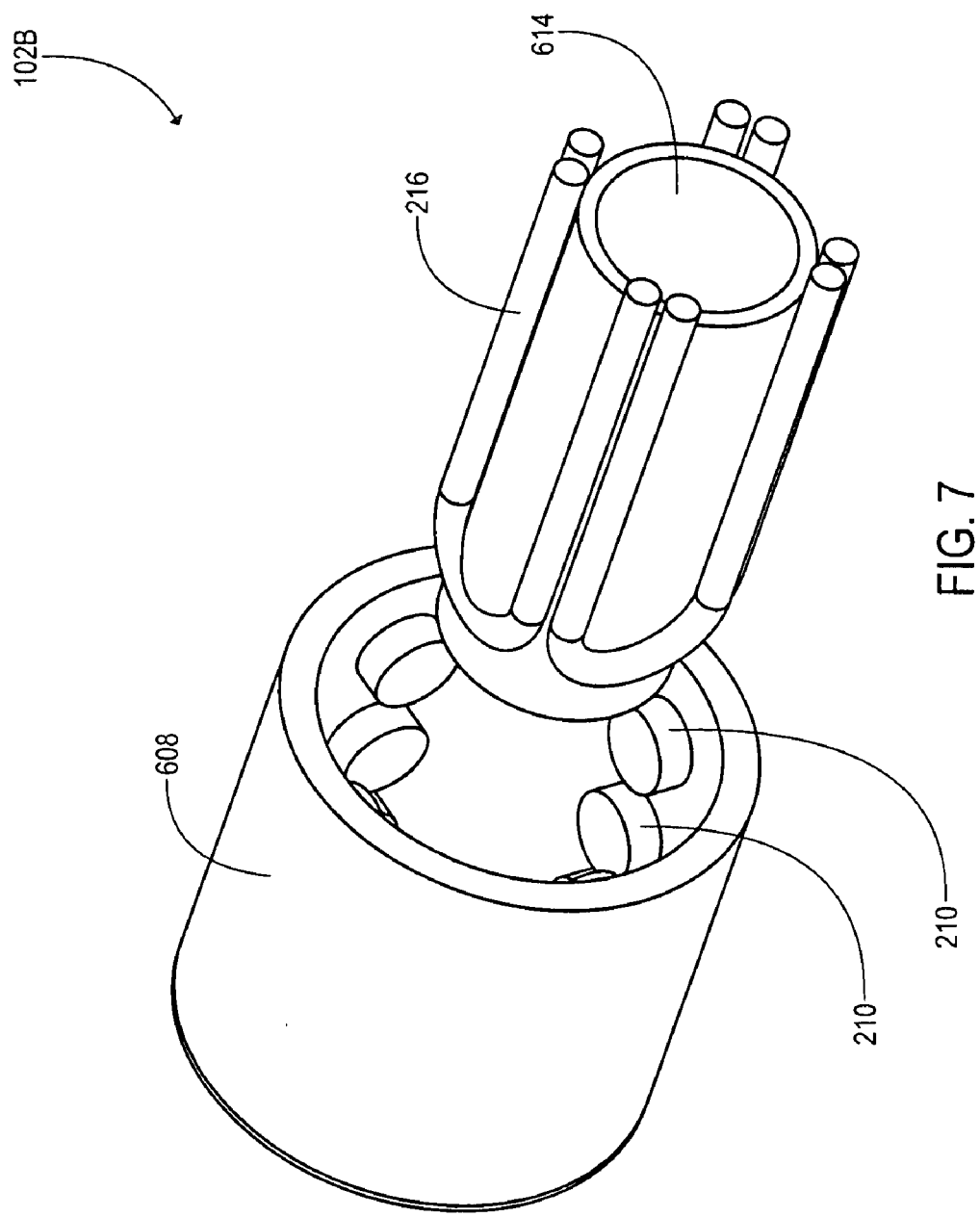
FIG. 7 is an exploded view of the pulsed-power device of FIG. 6 according to various embodiments presented herein.

FIG. 6 shows a pulsed-power device 102 configuration in which the banding material 212 is not positioned within the gap between the HTSs 210 and the armature coils 216. According to this embodiment, a radial-flux, external rotor pulsed-power device 102B is configured with an external rotor assembly 602 and an internal stator assembly 604. FIG. 7 illustrates an exploded view of the radial-flux, external rotor pulsed-power device 102B whereby the internal stator assembly 604 is removed from the external rotor assembly 602. According to this embodiment, the external rotor assembly 602 includes an external rotor 608 that rotates around the stationary internal stator assembly 604.

The HTSs 210 are mounted on the inside surface of the external rotor 608 in four rows of three HTSs 210 each, similar to the configuration of HTSs 210 on the exterior of the internal rotor assembly 202 discussed above. Because the HTSs 210 are mounted on the inside surface of the external rotor 608, the rotor provides the required mechanical constraint to hold the HTSs 210 in place while the external rotor 608 is spinning and further banding material 212 is not necessary. Without the banding material 212, the radial-flux, external rotor pulsed-power device 102B may allow for a closer gap distance between the armature coils 216 and the rotating HTSs 210.

The internal stator assembly 604 includes an internal stator 614 and the armature coils 216 mounted on an outside surface of the internal stator 614. As with the radial-flux, internal rotor pulsed-power device 102A discussed above, there are four armature coils 216, one for each row of HTSs 210; however, an alternative embodiment similar to that shown in FIG. 5 may allow for two armature coils 216 for each row of HTSs 210. According to one embodiment, additional material 616 is added to the exterior of the external rotor 608 to increase the flywheel energy storage capabilities of the radial-flux, external rotor pulsed-power device 102B. It should be understood that the external rotor 608, the radial-flux, external rotor pulsed-power device 102B may be used not only to supply pulsed power but also to store the required energy for multiple pulses as may be desired in various commercial and military applications.

Figure 8:
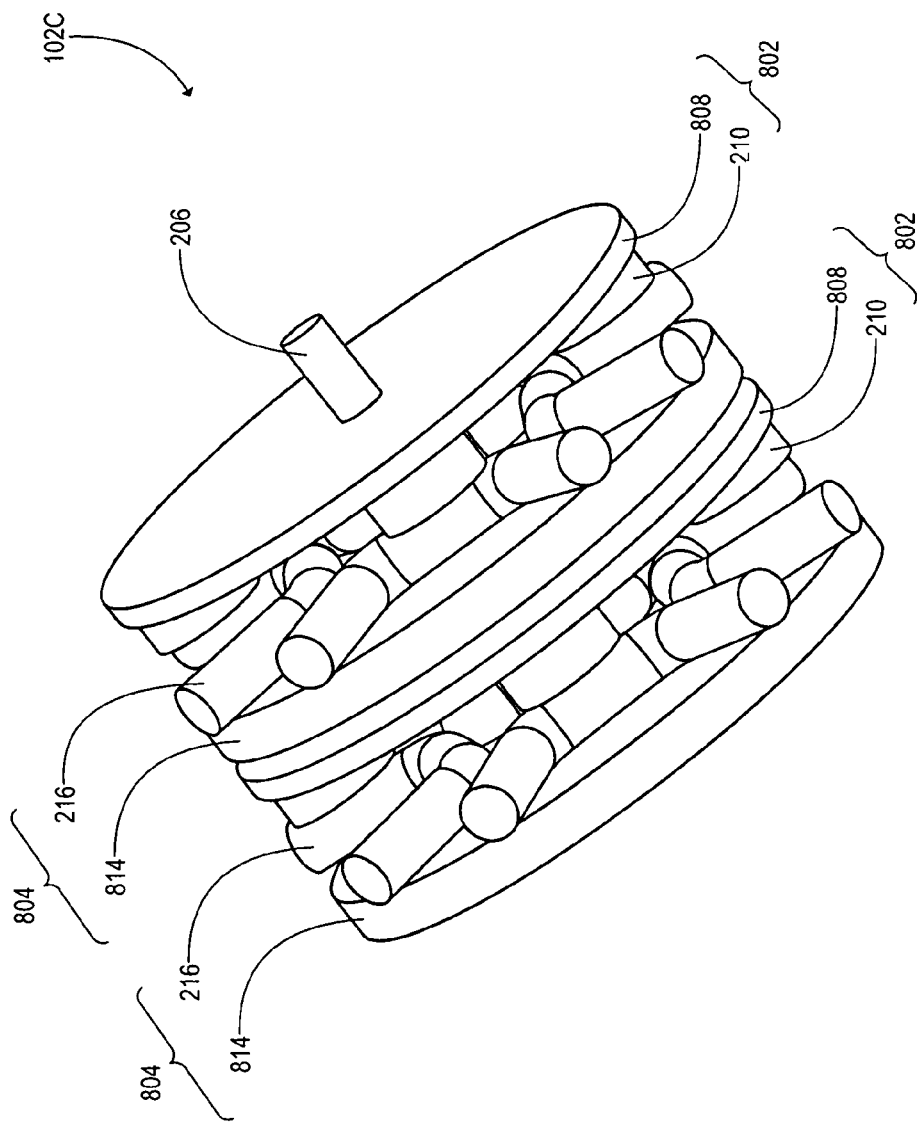
FIG. 8 is a perspective view of a pulsed-power device according to an axial-flux configuration according to various embodiments presented herein.
Figure 9:
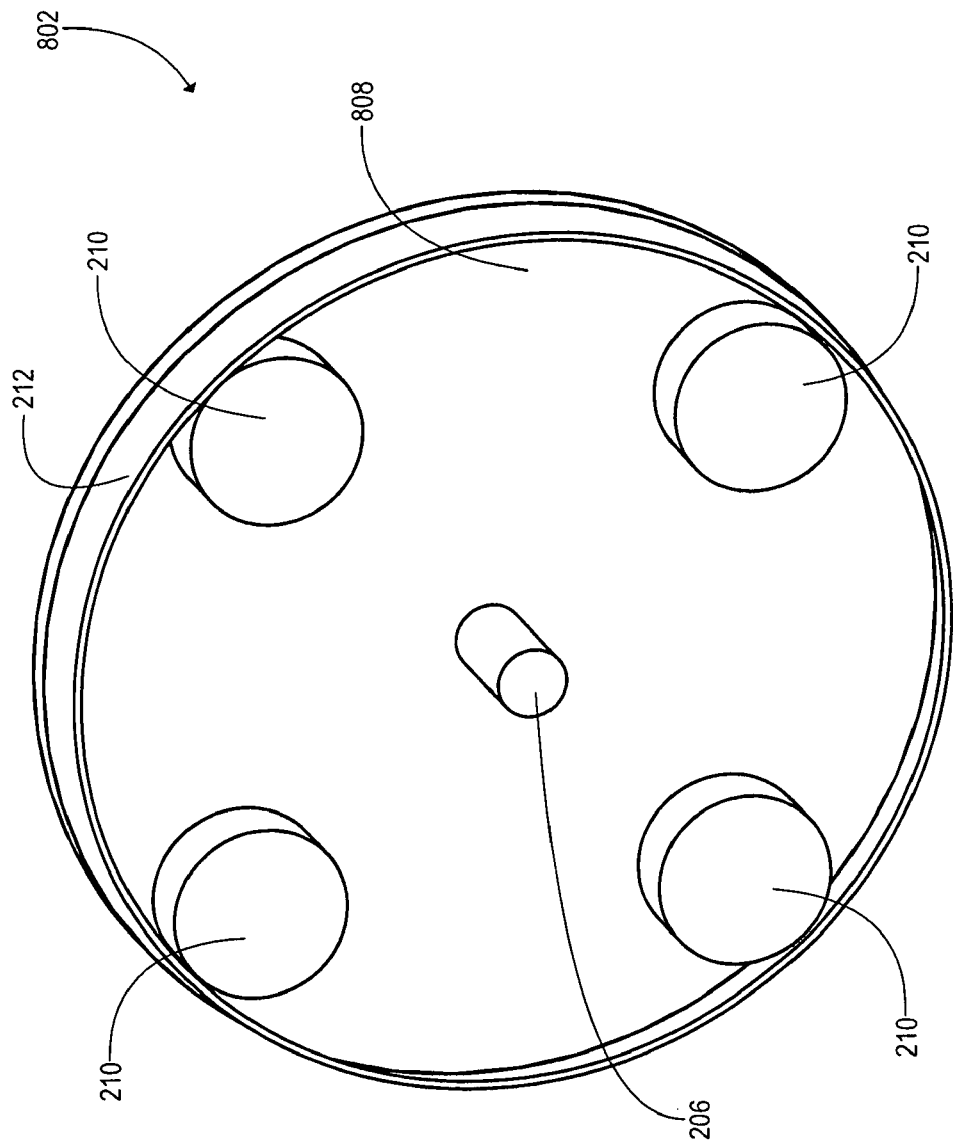
FIG. 9 is a perspective view of a rotor assembly for use within the pulsed power device of FIG. 8 according to various embodiments presented herein.
Figure 10:
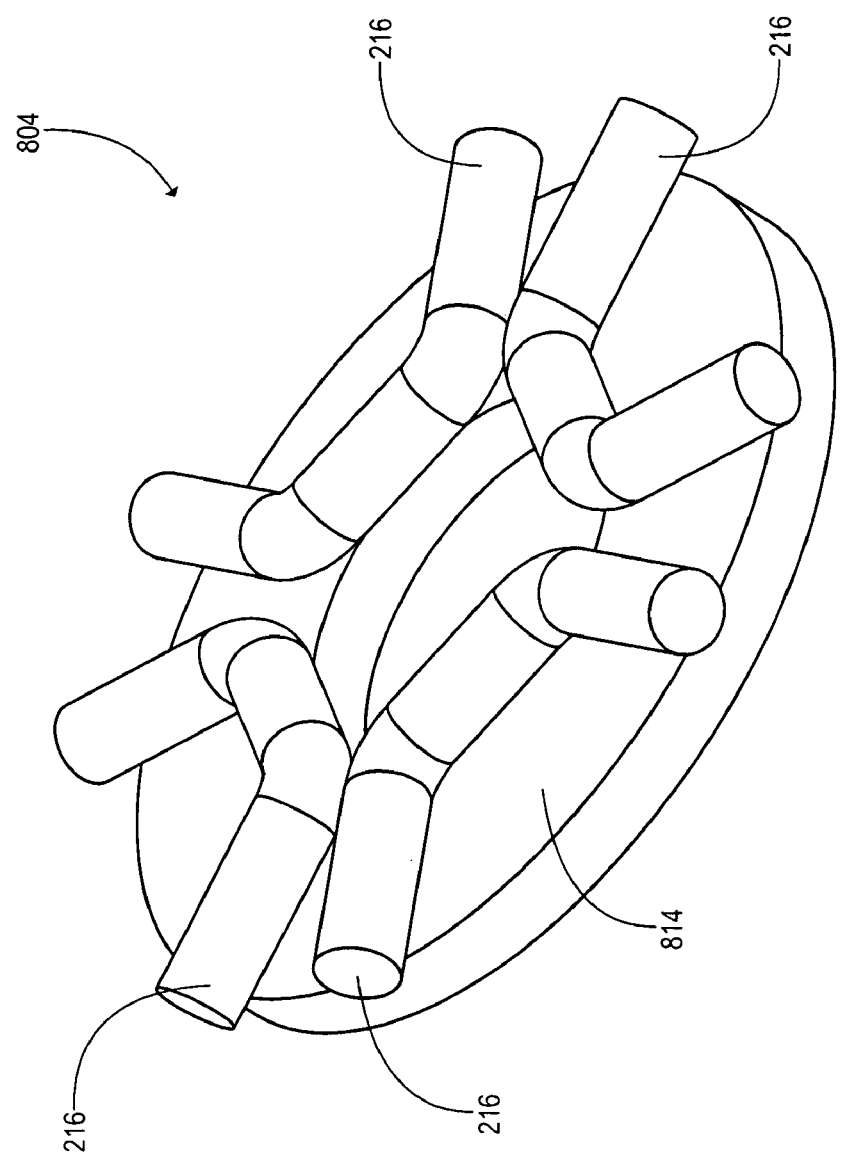
FIG. 10 is a perspective view of a stator assembly for use within the pulsed power device of FIG. 8 according to various embodiments presented herein.

FIGS. 8-10 illustrate an alternative embodiment of the pulsed-power device 102 in which the rotors and stators are configured axially rather than radially. The axial-flux pulsed-power device 102C shown in FIG. 8 includes two sets of rotor assemblies 802 and stator assemblies 804 configured as disks. However, any number of rotor assemblies 802 and stator assemblies 804 may be utilized depending on the operational parameters of the axial-flux pulsed-power device 102C. As seen in FIG. 9, each rotor assembly 802 includes a rotor disk 808 attached at the center to the shaft 206. Four HTSs 210 are mounted on the rotor disk 808 at evenly spaced intervals and magnetized axially. Although not shown in FIG. 8, various embodiments of the axial-flux pulsed-power device 102C may include banding material 212 to secure the HTSs 210 against the centrifugal forces present during operation. FIG. 9 shows the banding material 212. If any banding material 212 is necessary to secure the HTSs 210 against the centrifugal forces during operation, the banding material would not interfere with the gap between the HTSs 210 and the armature coils 216 due to the axial configuration of the axial-flux pulsed-power device 102C.

FIG. 10 shows an example of a stator assembly 804. Each stator assembly 804 includes a stator disk 814 and an armature coil 216 for each HTS 210 mounted on the rotor disk 808. Each armature coil 216 enters and leaves the adjacent HTS 210 region radially with a circumferential end turn proximate to the center of the stator disk 814. During operation, the shaft 206 rotates the rotor disks 808. When rotating, the trapped magnetic fields within the HTSs 210 induce a voltage in the armature coils 216 to produce a pulsed current output. It should be appreciated that the HTSs 210 and the armature coils 216 may be mounted on either side of the rotor disks 808 and stator disks 814, respectively, such that the rotor disks 808 are either inside or outside the stator disks 814.

The operation of the pulsed-power devices 102 is similar across all three configurations described above: the radial-flux, internal rotor pulsed-power device 102A; the radial-flux, external rotor pulsed-power device 102B; and the axial-flux pulsed-power device 102C. According to all three embodiments, two pulsed-power devices 102 are electrically linked. The rotors of the pulsed-power devices 102 rotate such that the bulk HTSs 210, which contain trapped magnetic fields much higher than those available with conventional compulsators that utilize field windings or even permanent magnets, pass in close proximity to the armature coils 216 on the adjacent stators. In doing so, the magnetic field from each HTS 210 induces a voltage in the armature coils 216. The power control circuitry 112 allows the resulting current from the pair of pulsed-power devices 102 to flow from the devices in pulses.

The pulsed-power devices 102 described above are utilized in tandem to charge the HTSs 210 within the pulsed-power devices 102 by providing the required trapped magnetic fields within the HTSs 210. Because the current required to create a magnetic field within a HTS 210 is less than the resultant pulsed current output from the pulsed-power device 102 when the rotors are rotating at operational speed, the two pulsed-power devices 102 can be used to bootstrap charge each other. A small charge is applied to the first pulsed-power device 102 to partially charge the HTSs 210 to a level corresponding to the small charge. The pulsed current from the first pulsed-power device 102 is then routed to the second pulsed-power device 102 to charge the corresponding HTSs 210 to a level higher than that of the HTSs in the first pulsed-power device 102. The procedure is then repeated from the second pulsed-power device 102 to the first and so forth until the HTSs 210 of both pulsed-power devices 102 are fully charged.

Figure 11A:
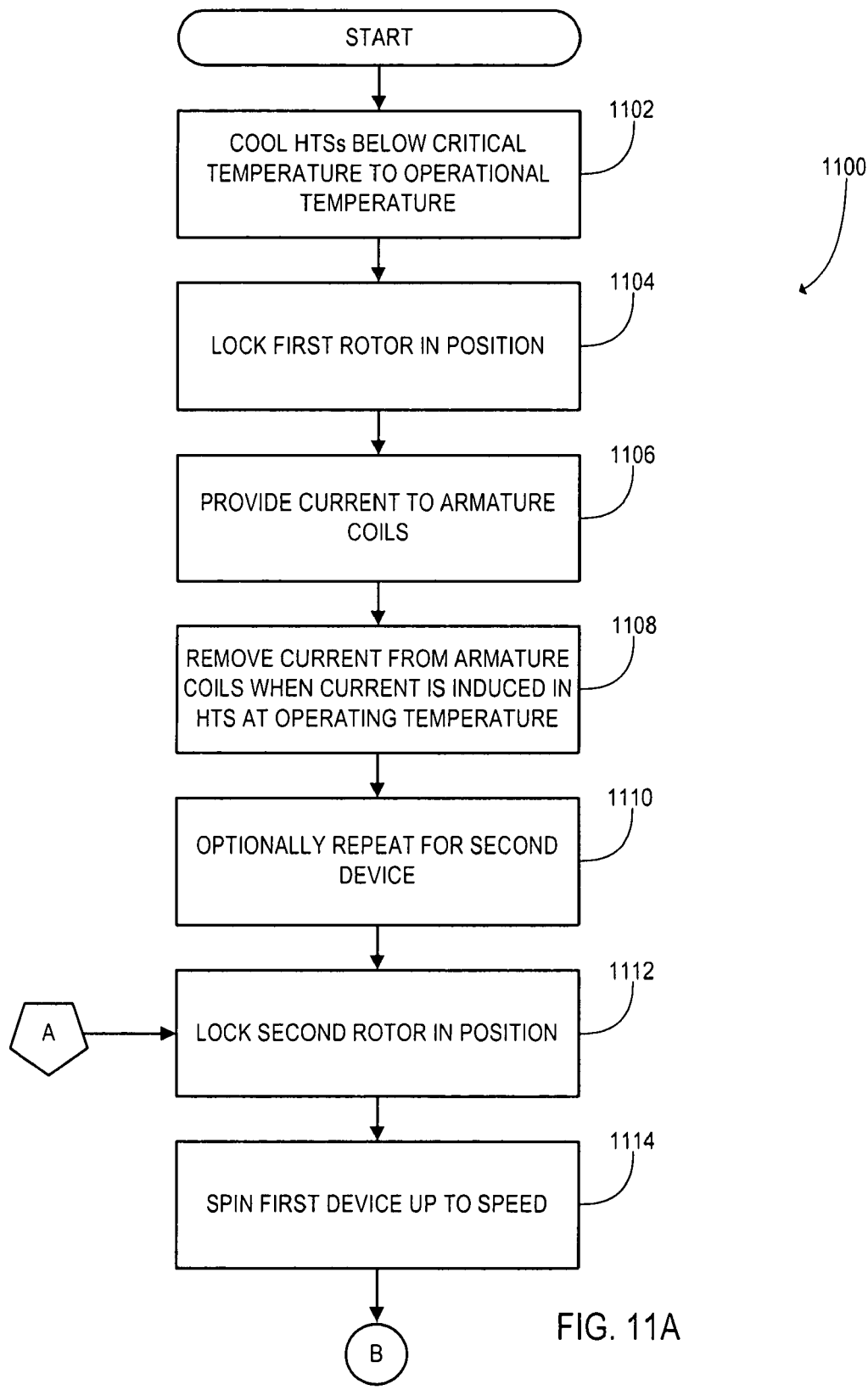
FIGS. 11A and 11B are flow diagrams illustrating a method for utilizing high temperature superconductors to provide pulsed-power according to various embodiments presented herein.
Figure 11B:
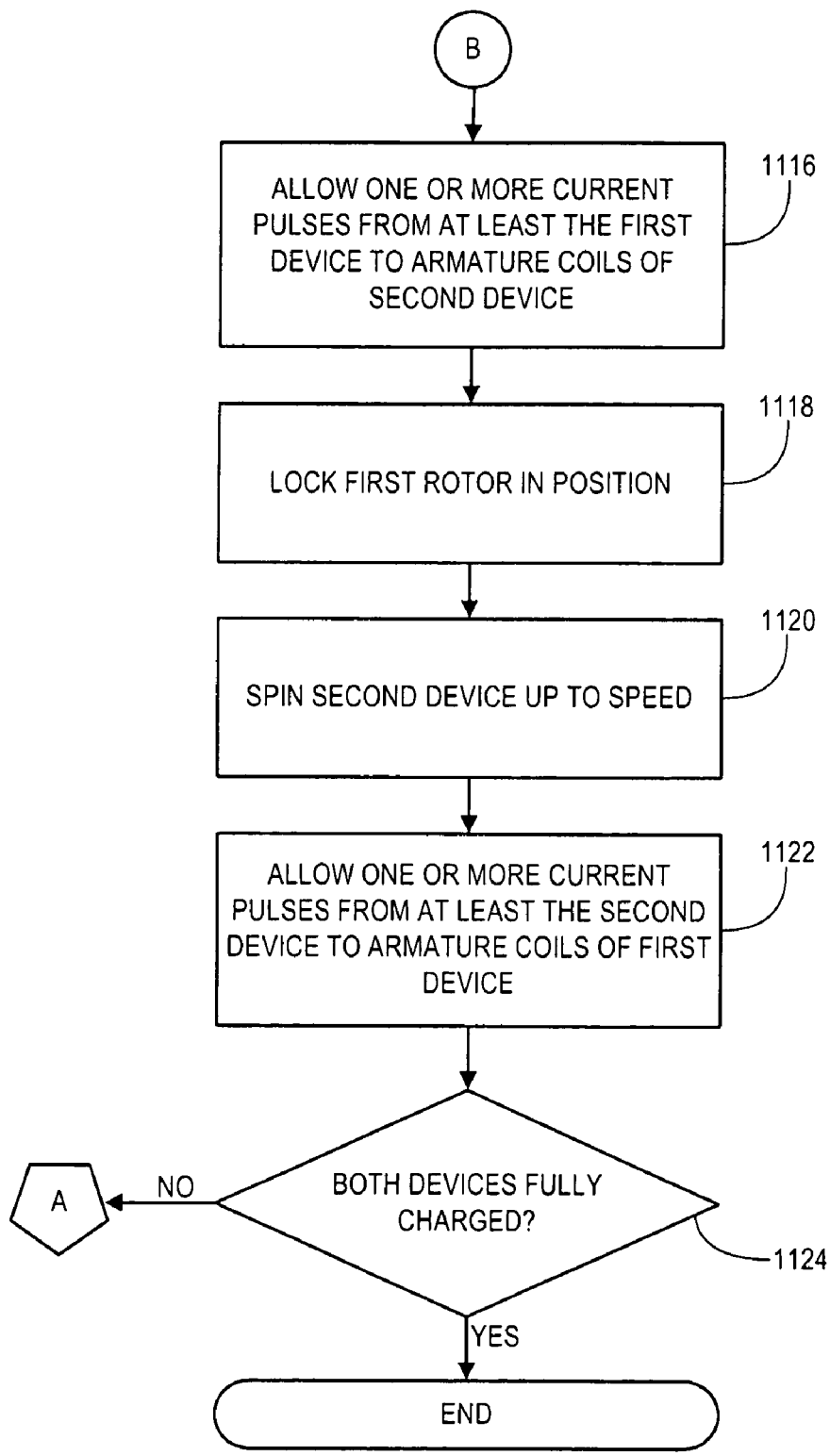

Turning now to FIGS. 11A and 11B, an illustrative routine 1100 for bootstrap charging two pulsed-power devices 102 will now be described in detail. The routine 1100 will be described with respect to the pulsed-power system 100 shown in FIG. 1. The routine 1100 begins at operation 1102, where the HTSs 210 of both pulsed-power devices 102 are cooled to a temperature below the critical temperature associated with the HTSs 210. It should be appreciated that the HTSs 210 of the first pulsed-power device 102 may be cooled first prior to receiving an initial charge, followed by cooling the HTSs 210 of the second pulsed-power device 102 at a subsequent time when they are to receive the initial charge.

The HTSs should be cooled to their corresponding operating temperatures to maximize the magnetic field that can be trapped according to the operational parameters of the pulsed-power device 102. As discussed above, the cooling system 110 used to cool the HTSs 210 may utilize any one or more of several cooling techniques, including using thermal conduction between the rotor and a cold head, cooling the stator and relying on radiation heat transfer from the rotor to the stator, and utilizing a cryocooler to cool gas within the rotor or in the gap between the rotor and stator.

From operation 1102, the routine 1100 continues to operation 1104, where the first rotor is locked into a position that allows the magnetic field from the armature coils 216 to be centered on the HTSs 210 or otherwise applied to provide a maximum magnetizing effect. The routine 1100 continues to operation 1106, where a current from the DC current source 106 is provided to the armature coils 216. This should occur when the HTSs 210 are at operational temperature or as the temperature is lowered through the critical temperature to the operational temperature. When the HTSs 210 are at operational temperature, the current from the DC current source 106 is removed at operation 1108.

From operation 1108, the routine 1100 continues to operation 1110, where this initial charging procedure is optionally performed for the second pulsed-power device 102. Doing so is not necessary, as the first pulsed-power device 102 will be used to charge the second pulsed-power device 102. However, providing an initial charge to the second pulsed-power device 102 using the DC current source 106 while the first pulsed-power device 102 is being initially charged, then the first pulsed current sent from the first pulsed-power device 102 will increase the initial charge in the second pulsed-power device 102, potentially speeding the overall process.

The routine 1100 continues from operation 1110 to operation 1112, where the second rotor, which is the rotor in the second pulsed-power device 102, is locked into place for charging as described above with respect to the first pulsed-power device 102. It should be noted that stopping the rotor of one of the pulsed-power devices 102 to align the armature coils 216 with the HTSs 210 may not be desired. According to an alternative embodiment, the pulsed current that is sent through the armature coils 216 may be timed according to the speed of the rotor to charge the HTSs 210 at the moments in which they are aligned with the armature coils 216. From operation 1112, the routine 1100 continues to operation 1114, where the first pulsed-power device 102 is spun up to operational speed in order to provide the pulsed current to the second pulsed-power device 102 for charging purposes. Spinning the first pulsed-power device 102 up to speed can be accomplished using the motor 108. Alternatively, current is sent through the armature coils 216 in order to spin the rotor. In this embodiment, the first pulsed-power device 102 works as a brushless synchronous motor while spinning up to speed.

The routine 1100 continues to operation 1116, where one or more current pulses from at least the first pulsed-power device 102 are routed to the armature coils 216 of the second pulsed-power device 102. This pulsed current provides an initial charge to the HTSs 210 in the second pulsed-power device 102 that is greater than that in the HTSs 210 of the first pulsed-power device 102. If an initial charge was provided to the second pulsed-power device 102 from the DC current source 106, then this pulsed current from the first pulsed-power device 102 increases that initial charge. As stated above, these current pulses may be timed such that stopping the rotor in the second pulsed-power device 102 is not necessary.

It should be understood that the pulsed power system 100 may include more than two pulsed-power devices 102. In embodiments having more than two pulsed-power devices 102, each pulsed-power device 102 may be charged using two or more pulsed-power devices 102. Pulses from more than one pulsed-power device 102 may be combined in parallel and pass through the armature coils 216 of the pulsed-power device 102 being charged. The maximum current possible through the armature coils 216 of the pulsed-power device 102 being charged would be limited according to the temperature management of the armature coils 216.

From operation 1116, the routine 1100 continues to operation 1118, where the rotor of the first pulsed-power device 102 is locked into position to accept a charge. At operation 1120, the second pulsed-power device 102 is spun up to speed for delivering a pulsed current to the first pulsed-power device 102. From operation 1120, the routine 1100 continues to operation 1122, where current pulses from the second pulsed-power device 102 are routed through the armature coils 216 of the first pulsed-power device 102 to further charge the HTSs 210 of the first pulsed-power device 102. The routine 1100 continues from operation 1122 to operation 1124, where a determination is made as to whether the HTSs 210 in both pulsed-power devices 102 are fully charged. If the HTSs 210 are fully charged, then the routine 1100 ends. However, if the HTSs 210 are not fully charged, then the routine 1100 returns to operation 1112 and the bootstrap charging continues as described above.

By utilizing the embodiments described above, electric motors and generators with high specific power may be created for use in weapons systems, launch systems, and any number and type of commercial and military aircraft systems. The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for charging a pulsed-power system, comprising:
   providing an initial charge to a first high temperature superconductor (HTS) mounted on a rotor within a first pulsed-power device;
   spinning the rotor within the first pulsed-power device such that the initial charge of the first HTS induces a voltage in a first armature coil within the first pulsed-power device;
   creating a pulsed current from the voltage induced in the first armature coil;
   routing the pulsed current to a second armature coil within a second pulsed-power device to induce a magnetic field around the second armature coil;
   introducing a second HTS mounted on a rotor within the second pulsed-power device to the magnetic field around the second armature coil to at least partially charge the second HTS;
   spinning the rotor within the second pulsed-power device such that the charge of the second HTS induces a voltage in the second armature coil;
   creating a pulsed current from the voltage induced in the second armature coil;
   routing the pulsed current to the first armature coil to induce a magnetic field around the first armature coil; and
   introducing the first HTS to the magnetic field around the first armature coil to increase the initial charge of the first HTS.

2. The method of claim 1, wherein providing the initial charge to the first HTS comprises:
   cooling the first HTS to a temperature below a critical temperature associated with the first HTS;
   aligning the first HTS with the first armature coil; and
   providing current from an external direct current (DC) power source to the first armature coil to induce a magnetic field that magnetizes the first HTS to create the initial charge.

3. The method of claim 2, wherein the DC power source comprises a battery or a capacitor.

4. The method of claim 1, wherein spinning the rotor within the first pulsed-power device such that the initial charge of the first HTS induces a voltage in a first armature coil comprises utilizing an external motor to rotate a shaft attached to the rotor such that the first HTS rotates within a distance of the first armature coil that subjects the first armature coil to a magnetic field corresponding to the initial charge.

5. The method of claim 1, further comprising:
   cooling the second HTS to a temperature below a critical temperature associated with the second HTS; and
   wherein introducing the second HTS to the magnetic field around the second armature coil to at least partially charge the second HTS comprises aligning the second HTS with the second armature coil such that the second HTS is within a distance of the second armature coil that subjects the second HTS to the magnetic field created by the pulsed current in the second armature coil.

6. The method of claim 5, wherein introducing the first HTS to the magnetic field around the first armature coil to increase the initial charge of the first HTS comprises aligning the first HTS with the first armature coil such that the first HTS is within a distance of the first armature coil that subjects the first HTS to a magnetic field created by the pulsed current in the first armature coil.

7. The method of claim 5, wherein aligning the second HTS with the second armature coil comprises timing the pulsed current to coincide with an instance at which the second HTS is within the distance of the second armature coil that subjects the second HTS to the magnetic field created by the pulsed current in the second armature coil while the rotor within the second pulsed-power device is rotating.

8. The method of claim 5, wherein aligning the second HTS with the second armature coil occurs while the rotor within the second pulsed-power device is stationary, and wherein cooling the second HTS to the temperature below the critical temperature associated with the second HTS comprises cooling the rotor within the second pulsed-power device while the rotor is stationary using thermal conduction between the rotor and a cold head.

9. The method of claim 5, wherein cooling the second HTS to the temperature below the critical temperature associated with the second HTS comprises utilizing a cryocooler to cool gas flowing within the second pulsed-power device.

10. A method to provide pulsed current to a load, comprising:
    positioning a rotor of a first pulsed-power device such that a HTS mounted on the rotor of the first pulsed-power device is aligned with an armature coil mounted on a stator of the first pulsed-power device;

receiving a current within the armature coil of the first pulsed-power device to induce a magnetic field within the HTS of the first pulsed-power device;

positioning a rotor of a second pulsed-power device such that a HTS mounted on the rotor of the second pulsed-power device is aligned with an armature coil mounted on a stator of the second pulsed-power device;

rotating the rotor of the first pulsed-power device such that the magnetic field within the HTS of the first pulsed-power device induces a voltage in the armature coil of the first pulsed-power device;

routing a pulsed current created from the voltage in the armature coil of the first pulsed-power device to the armature coil of the second pulsed-power device;

receiving the pulsed current from the first pulsed-power device within the armature coil of the second pulsed-power device to induce a magnetic field within the HTS of the second pulsed-power device;

rotating the rotor of the first pulsed-power device and the rotor of the second pulsed-power device such that the magnetic field within the HTS of the first pulsed-power device and the magnetic field within the HTS of the second pulsed-power device induces a voltage in the armature coil of the first pulsed-power device and in the armature coil of the second pulsed-power device; and routing the pulsed current created from the voltage in the armature coil of the first pulsed-power device and in the armature coil of the second pulsed-power device to the load.

11. The method of claim 10, wherein the first pulsed-power device is configured in a radial, internal rotor configuration such that rotating the rotor of the first pulsed-power device such that the magnetic field within the HTS of the first pulsed-power device induces the voltage in the armature coil of the first pulsed-power device comprises rotating the rotor of the first pulsed-power device within the stator of the first pulsed-power device such that the magnetic field within the HTS mounted on an external surface of the rotor of the first pulsed-power device induces the voltage in the armature coil mounted on an interior surface of the stator of the first pulsed-power device.

12. The method of claim 10, wherein the first pulsed-power device is configured in a radial, external rotor configuration such that rotating the rotor of the first pulsed-power device such that the magnetic field within the HTS of the first pulsed-power device induces the voltage in the armature coil of the first pulsed-power device comprises rotating the rotor of the first pulsed-power device around the stator of the first pulsed-power device such that the magnetic field within the HTS mounted on an interior surface of the rotor of the first pulsed-power device induces the voltage in the armature coil mounted on an exterior surface of the stator of the first pulsed-power device.

13. The method of claim 10, wherein the first pulsed-power device is configured in an axial configuration such that rotating the rotor of the first pulsed-power device such that the magnetic field within the HTS of the first pulsed-power device induces the voltage in the armature coil of the first pulsed-power device comprises rotating a rotor disk of the first pulsed-power device opposite a fixed stator disk of the first pulsed-power device such that the magnetic field within the HTS mounted on a surface of the rotor disk of the first pulsed-power device induces the voltage in the armature coil mounted on an opposing surface of the stator disk of the first pulsed-power device.

* * * * *